United States Patent Office 2,958,717
Patented Nov. 1, 1960

2,958,717
CATALYTIC DEHYDROGENATION OF HYDROCARBONS

Olin C. Karkalits, Jr., and Harold F. Christmann, Houston, Tex., assignors to Petro-Tex Chemical Corporation, Houston, Tex., a corporation of Delaware No Drawing. Filed Oct. 29, 1958, Ser. No. 770,311

9 Claims. (Cl. 260—680)

This invention relates to catalytic dehydrogenation of hydrocarbons and relates more particularly to titanium dioxide catalysts for dehydrogenating olefins.

Catalytic dehydrogenation of mono-olefins such as the butylenes to butadiene is practiced commercially with autoregenerative catalysts consisting essentially of alkalized iron oxides. Because of the commercial importance of butadiene there has been a continuing search for improved dehydrogenation catalysts for converting n-butylenes into butadiene. Such improved catalysts should have long life, would require minimum regeneration and would have and maintain over a period of time high selectivity so as to most economically utilize butylenes, preferably at lower temperatures. While the alkalized iron oxide catalysts used commercially are satisfactory catalysts for the dehydrogenation of butylenes, the life of these catalysts is somewhat limited. As is known to those skilled in the art, after some months use, the alkalized iron oxide catalysts are less responsive to steam regeneration and higher temperatures of reaction are required to be commercially satisfactory. Further, these catalysts, in pellet form, are quite hygroscopic and as a result are difficult to handle in loading reactors, and the mechanical stability in the reactor offers many problems.

It is an object of this invention to provide an improved autoregenerative dehydrogenation catalyst for the conversion of mono-olefins including butylenes, methylbutylenes, and the like, into conjugated dienes including butadiene-1,3 and isoprene, in the presence of steam. Such an improved catalyst would be autoregenerative, would have long life, would have enhanced selectivity and would have improved mechanical stability in the reactor. Other objects of the invention will be apparent from the description thereof, which follows.

A novel catalyst which attains these objectives is provided by this invention. This novel and improved catalyst contains a substantial proportion of titanium dioxide, an alkali metal compound convertible to a carbonate under autoregenerative dehydrogenation reaction conditions in the presence of steam, and ferric oxide. This titanium dioxide catalyst is readily provided in the forms of hard, tough pellets which have excellent mechanical stability and are easy to handle. Pellets of the catalyst of this invention may be handled in a normal manner in loading reactors without excessive pickup of moisture which weakens pellets and may contribute to stratification in the reactors. Further, pellets of the catalyst of this invention have excellent stability in the reactor and are readily removed from the reactor when such removal is necessary. It was found, quite unexpectedly, that the activity of the novel catalysts of this invention was such that excellent selectivity and conversion at lower temperatures with n-butenes were attained, particularly with methyl-butenes. Important consequences of this factor are that more efficient utilization of butylenes such as methyl-butylenes is obtained and the dehydrogenation reactions may be conducted at lower temperatures to give useful conversion and yield without loss of desirable materials that occur when higher temperatures must be employed. Thus, more effective and economical use is made of the raw materials and readier recovery of the desired reaction products, the conjugated diolefins, is possible because of more selective catalytic dehydrogenation.

The catalyst of this invention, normally, contains from about 25 to about 60 weight percent titanium dioxide, the remainder being substantial amounts of ferric oxide and potassium carbonate. The ratio of iron oxide to potassium carbonate may be varied quite widely, as about 5 to 200 weight percent of potassium compound, calculated as potassium carbonate, to ferric oxide, but more preferably is one weight part of iron oxide with from about one-half to about two weight parts of potassium carbonate. On a percentage basis, when the amount of titanium dioxide in the catalyst is 60 weight percent there would be employed from about 26 to 13 weight percent of ferric oxide and about 13 to about 26 weight percent potassium carbonate. Better results may be obtained when the titanium dioxide component of the catalyst is present in amount from about 35 to 50 weight percent with about 20 to 40 weight percent ferric oxide and about 20 to 40 weight percent potassium carbonate.

Although potassium carbonate is the preferred alkali metal compound, it will be understood by the man skilled in the art that other alkali metal compounds convertible to the carbonate under the autoregenerative dehydrogenation reaction conditions in the presence of steam may also be used. Such other materials include potassium oxide, potassium acetate, potassium bicarbonate and the like.

The ferric oxide employed in the practice of this invention may be obtained from a variety of sources and although the art has, up to the present, used ferric oxide which has been calcined at temperatures between about 700° C. and 900° C., we have found that it is not essential that the ferric oxide be so prepared to obtain the advantages of the novel catalyst of this invention. Ferric oxide prepared by precipitating hydrous ferric oxide from a solution of an iron salt, which is dried only to the point to remove water, is satisfactory in preparing the catalyst. Such precipitated hydrous ferric oxides are readily prepared by the addition of alkali metal hydroxides and carbonates, including ammonium hydroxide and ammonium carbonate, to aqueous solutions of ferric salts such as the chloride, sulfate, acetate, nitrate and the like. Many other methods of making ferric oxide are known, including precipitation and/or oxidation-reduction reactions of ferrous iron salts in solution, and the like. Ferrous carbonate, prepared by precipitation is readily converted to ferric oxide on heating. Of course, calcined ferric oxide may be utilized.

While titanium dioxide from any source may be utilized, pigment grade titanium dioxide containing more than about 70 percent $TiO_2$ in a dry, finely divided state is preferred. Such material is readily obtained, for example, from titanium hydrate which has been calcined at about 900 to 950° C., or derived from titanium tetrachloride by reacting titanium tetrachloride with oxygen at 800 to 1200° C.

It is often desirable to add additional ingredients to the catalyst composition described above. These additional ingredients, which are generally referred to as stabilizers, preferably are metal oxides of Group VIb of the periodic table. Although a number of other materials are known to those skilled in the art as stabilizers, the metal oxides in this group have proved to be most efficient. Such stabilizers are used in minor amounts. A preferred material for this use is chromium oxide in amounts from about one to 5 weight percent. The oxide of chromium or other VIb metal oxide, if employed, may be introduced with the iron by coprecipitation or mixed as the dry chromium sesquioxide powder in the procedures described below.

In the preparation of the catalysts of this invention, finely divided titanium dioxide, ferric oxide and anhydrous potassium carbonate may be powder mixed and tableted, or more preferably may be mixed with a small amount of water and extruded in pellet form and the pellets dried. Any of the methods known to those skilled in the art for obtaining the desired mixture and pellets of titanium dioxide, ferric oxide and potassium carbonate may be employed. Normally, the pellets will be dried to contain less than about one-half percent water before charging to a dehydrogenation reactor.

Another expedient way to prepare the catalyst is to precipitate from solutions of iron, as by the addition of alkali metal hydroxide and carbonates including ammonium hydroxide and carbonate, ferrous carbonate or ferric oxide hydrates, mix with titanium dioxide and add potassium nitrate, either prior to or after drying the precipitated iron compound. The mixture is then dried, heated for about 3 hours at about 1200° F., cooled and formed into pellets. Under such conditions, the catalyst material contains titanium dioxide, ferric oxide and potassium oxide. Of course, under dehydrogenation conditions, in the presence of steam, the potassium oxide is converted to potassium carbonate. The preferred procedure is to thoroughly mix, dry, finely divided, red iron oxide ($Fe_2O_3$) of a pigment type with finely divided, dry titanium dioxide of a pigment type, and then potassium carbonate is added either in the anhydrous form and water added thereafter to form a paste, or a solution of potassium carbonate is added to the mixture of the two oxides to form a paste, which paste is then extruded to form pellets which are then dried. It may be desirable under some circumstances to dry the pellets at temperatures as high as 500 or 600° C., but normally, drying at a temperature of about 150° C. until the pellets contain less than about 0.10 percent moisture is satisfactory to produce pellets of the required mechanical stability and catalytic activity.

Still another method of preparing the catalyst is to prepare a solution of ferric nitrate and chromic nitrate in water. Titanium dioxide pigment is stirred into this solution and a solution of potassium carbonate is added to this suspension. The resulting precipitate is filtered and more potassium carbonate or potassium nitrate is added thereto. The mixture is dried and heated at about 1200° F. for about 3 hours if potassium nitrate is employed, or dried at any desirable temperature if potassium carbonate is used. The resulting powder is then ground and pelletted.

The particle size and shape of the catalyst pellets themselves may be varied but it is well understood by those skilled in the art that pellets of too small a particle size cause undesirable pressure drop in fixed bed operations and ordinarily poor results are obtained at equivalent flow rates with very large pellets. A useful range of pellet particle size is from about 1/32 to about one-half inch or more, more preferably about 3/16 inch to 3/8 inch of a cylindrical shape in which, normally, the diameter and height of the pellets range from the same dimensions to those wherein the pellets are about 3 to 5 times in length the diameter of the pellet.

The process of the invention using the novel catalyst as described is carried out under autoregenerative conditions, i.e. at temperatures above about 580° C. and generally below about 700° C. in the presence of a molar excess of steam, i.e. 2 to 15 moles of steam per mole of olefin, under which conditions the dehydrogenation may be carried out substantially continuously over long periods of time. The reaction may be carried out at any desired pressure in any desired type of reaction system, and in fixed or fluid beds, and is of general application where autoregenerative dehydrogenation, as pointed out above, is employed in the dehydrogenation of olefins and alkylaromatic hydrocarbons in general and particularly n-butylene to butadiene, isopentylenes to isoprene, the dehydrogenation of ethyl benzene to styrene, and the like, particularly hydrocarbons containing 4 to 8 carbon atoms.

In the following examples, relatively standard testing conditions are employed and an olefin and steam are passed through a catalyst bed at selected temperatures and at a standard space velocity and steam/olefin molar ratio. The gaseous space velocity was held at 350 volumes per hour per unit volume of catalyst. The steam/olefin ratio was maintained at 13 moles of steam/mole of olefin. The olefin employed in Examples 1 through 10 contained about 98 percent butylene-2. The water used to form the steam is redistilled plant steam condensate. The catalyst in each case was given a two-hour pretreatment in a stream of steam and hydrogen in which the hydrogen flow rate is adjusted so that the effluent gas contains 2/10 mole fraction of hydrogen. During this pretreatment, the steam rate is set so that it will give a molar ratio of 13 to 1 of steam to olefin when the olefin feed is started. At the end of the two-hour pretreatment, the hydrogen flow is shut off and olefin is introduced. After flow conditions have been established, samples for analysis were taken at periodic intervals. Conversion is defined as the moles of olefin consumed per 100 moles of olefin fed to the reactor. Selectivity is defined as moles of diolefin formed per 100 moles of olefin consumed. Yield is the product of conversion and selectivity. Ordinarily, at a given yield, say 20 mole percent, the highest selectivity obtainable is desired. A valuable bench mark is the total number value of conversion plus selectivity since this figure is relatively independent of temperature variation in the reactor.

Example 1

90 weight parts of ferric oxide which had been calcined for 30 minutes at 850° C. and passed through a 100 mesh screen was dry mixed with 80 weight parts of finely divided pigment grade titanium dioxide of 99.8 percent purity and 44 weight parts of powdered anhydrous potassium carbonate. The mixed powders were classified through a 40 mesh screen and the screened mixture of materials was compressed into 5/32 inch tablets. The apparent bulk density of the tablets was 1.26 grams per cubic centimeter. The tableted catalyst contained 42 weight percent ferric oxide, 21 weight percent potassium carbonate and 37 weight percent titanium dioxide. This catalyst was evaluated under the standard test conditions described above at the indicated temperatures, and the results obtained in terms of butadiene-1,3 were:

| Temp., °F. | Mole percent Conversion | Mole percent Selectivity | Mole percent Yield |
|---|---|---|---|
| 1,175 | 35 | 74 | 26 |
| 1,215 | 46 | 67 | 31 |
| 1,255 | 59 | 58 | 34 |

The total conversion-selectivity values of 109 to 117 are exceptionally good.

Another catalyst was prepared with the same amounts of iron oxide, titanium dioxide and potassium carbonate and the mixture of powders in this case was moistened with water and extruded as pellets which were dried at 150° C. to a moisture content of less than about 0.10 percent. The dried pellets were 1/8 inch in diameter and 3/8 inch long. These pellets had excellent mechanical stability, were very hard and on minimum exposure to the atmosphere were essentially non-hydroscopic.

These catalysts were placed in a time study reactor at 1175° F. After 440 hours the mole percent conversion was 25, the mole percent selectivity was 82 and the mole percent yield was 21 percent, the C—S value being 107. At 500 hours the temperature was raised to 1200° F. and after a total life time of 630 hours the mole percent conversion was 32, the mole percent selectivity was 78 and the mole percent yield was 25. The C—S value was 110.

Example 2

75 weight parts of ferric oxide which had been calcined for 30 minutes at 850° C. and passed through a 100 mesh screen was mixed with 95 weight parts of powdered titanium dioxide of greater than 99 percent purity and 44 weight parts of anhydrous potassium carbonate powder. The mixture of powder was classified through a 40 mesh screen, the resulting product was dry compressed into tablets 5/32 inch in diameter which had a bulk density of 1.32 grams per cubic centimeter. This catalyst contained about 44 weight percent titanium dioxide, 35 weight percent iron oxide and 21 percent potassium carbonate. Results obtained on testing this catalyst as described above in terms of conversion to butadiene-1,3 were:

| Temp., °F. | Mole percent Conversion | Mole percent Selectivity | Mole percent Yield |
|---|---|---|---|
| 1,175 | 36 | 71 | 26 |
| 1,215 | 48 | 64 | 31 |
| 1,255 | 60 | 57 | 34 |

The total C—S values of 107 to 117 and the percent yield of butadiene-1,3 are very good for autoregenerative catalysts over this temperature range.

Example 3

20 weight parts of anhydrous potassium carbonate powder, 20 weight parts of calcined ferric oxide powder and 60 weight parts of titanium dioxide pigment were mixed dry, the mixture moistened and extruded as 1/8 inch pellets which were dried at 120° C. The dried pellets were very hard. The resulting catalyst was evaluated as described above by the standard procedure and the results obtained in terms of butadiene-1,3 at 1215° F. were 16 mole percent conversion and 86 mole percent selectivity.

Although the C—S value of 102 is somewhat less than values obtained in the examples given before, a selectivity value of 86 at 1215° F. is excellent in that the butylenes in the feed stream are more efficiently converted into butadiene-1,3 and there is less material to be separated from the butadiene, making purification easier, and there is less material to be recycled back into the process. When catalysts containing 70 percent titanium dioxide with 15 percent each of ferric oxide and potassium carbonate are prepared and tested, the mole percent conversion is less than 10 percent even at 1255° F. and catalysts of this composition are not commercially useful.

Example 4

40 weight parts of anhydrous potassium carbonate, 35 weight parts of ferric oxide and 25 weight parts of pigment grade titanium dioxide, all in the form of fine powders, were dry mixed, enough water added to form a paste and the paste extruded into pellets 1/8 inch in diameter and 3/8 inch long which were dried at 150° C. The hard dry pellets were evaluated by means of the standard procedure and at 1175° F. The mole percent conversion was 21, the mole percent selectivity was 82 and the mole percent yield was 17. The C—S value of 103 is quite acceptable, particularly at this low temperature and the selectivity value of 82 is excellent. After 240 hours at 1175, the temperature of this catalyst bed was raised to 1200° F. After a total 350 hours, the mole percent conversion was 23, mole percent selectivity 86, mole percent yield 20, and the C—S value was 109.

Example 5

24 weight parts of anhydrous potassium carbonate, 21 weight parts of ferric oxide and 55 weight parts of titanium dioxide, all in the form of fine powders, were dry mixed, enough water added to form a paste and the paste extruded into pellets 1/8 inch in diameter and 3/8 inch long which were dried at 120° C. The hard dry pellets were evaluated by means of the standard procedure at 1175° F. The mole percent conversion was 19, the mole percent selectivity was 67 and the mole percent yield was 13. Higher yields and conversions are obtained at dehydrogenation reaction temperatures of 1225 and 1250° F.

Example 6

32 weight parts of anhydrous potassium carbonate, 28 weight parts of ferric oxide and 40 weight parts of titanium dioxide, all in the form of fine powders, were dry mixed, enough water added to form a paste and the paste extruded into pellets 1/8 inch in diameter and 3/8 inch long which were dried at 120° C. to a moisture content of less than 0.1 percent. The hard dry pellets which had a crush strength of 17 pounds were evaluated by means of the standard procedure and at 1175° F. The mole percent conversion was 20, the mole percent selectivity was 86 and the mole percent yield was 17. The C—S value of 106 is quite acceptable, particularly at this low temperature and the selectivity value of 86 is excellent. After 104 hours the mole percent conversion was 20 and the mole percent selectivity 86.

Example 7

32 weight parts of anhydrous potassium carbonate powder, 26 weight parts of finely divided ferric oxide, 40 weight parts of titanium dioxide of about 0.3 micron particle size and 2 weight parts of chromium sesquioxide were dry mixed and 10 weight percent water was added to the mixture to form a paste and the paste was extruded into pellets 1/8 inch in diameter and 3/8 inch long which were dried at 60° C. for 64 hours. This catalyst was evaluated by the standard procedure at 1175° F. After 305 hours at this temperature, the mole percent conversion was 20 and mole percent selectivity was 86. When this catalyst mixture was extruded as a paste in an extruder type pellet mill, pellets were obtained which had a crush strength of 18 pounds even when they contained 2 percent water.

When this example is repeated with hydrous ferric oxide prepared by precipitation from a solution of ferric nitrate with ammonium carbonate, or ferric oxide prepared by precipitating ferrous carbonate from ferrous nitrate with ammonium carbonate and drying at 150° C., and with rutile and anatase titanium dioxide pigment, similar results are obtained. Excellent results are obtained with the novel titanium dioxide catalysts prepared with iron oxide which has been calcined at temperatures no greater than about 500° C. as shown in the following two examples.

Example 8

32 weight parts of anhydrous potassium carbonate powder, 26 weight parts of precipitated ferric oxide pigment heated at a temperature no greater than 120° C. to dry, 40 weight parts of powdered titanium dioxide and 2 weight parts of chromic oxide powder were dry mixed together. Enough water was added to the powder mixture to form a paste and the paste was extruded into pellets 1/8 inch in diameter and 3/8 inch long which were dried at 60° C. for 64 hours. The hard dry pellets which had an apparent bulk density of 1.25 grams per cubic centimeter and a crush strength of 20 pounds, were evaluated by means of the standard procedure and the following results in terms of butadiene-1,3 were obtained:

| Temp., °F. | Mole percent Conversion | Mole percent Selectivity | Mole percent Yield |
|---|---|---|---|
| 1,175 | 24 | 82 | 20 |
| 1,215 | 34 | 77 | 26 |
| 1,255 | 44 | 73 | 32 |

Example 9

The above example was repeated with dry precipitated ferric oxide which was heated for ½ hour at 400° C. prior to mixing with the other powdered ingredients of the catalyst. The results obtained in terms of butadiene-1,3 when evaluated following the standard procedure were as follows:

| Temp., °F. | Mole percent Conversion | Mole percent Selectivity | Mole percent Yield |
|---|---|---|---|
| 1,175 | 23 | 83 | 19 |
| 1,215 | 33 | 78 | 26 |
| 1,255 | 43 | 73 | 31 |

Example 10

20 weight parts of anhydrous potassium carbonate powder, 16 weight parts of ferric oxide powder and 64 weight parts of pigment grade titania slag powder containing about 70 to 72 percent titanium dioxide, about 12 to 15 percent ferrous oxide, about 12 percent $Ti_2O_3$ and the remainder alumina, silica and magnesia, were dry mixed and ground together. Enough water was added to the powder mixture to form a paste and the paste extruded into pellets ⅛ inch in diameter and ⅜ inch long which were dried at 110° C. for 16 hours. The hard dry pellets were evaluated by means of the standard procedure and at 1175° F. The mole percent conversion was 21, the mole percent selectivity was 83 and the mole percent yield was 18. At 1215° F., the mole percent conversion was 33, the mole percent selectivity was 80 and the mole percent yield was 26. The finished catalyst pellets contained about 45 parts of titanium dioxide slag, 20 parts of ferric oxide and 16 parts of potassium carbonate, or 55 percent $TiO_2$, 25 percent $Fe_2O_3$ and 20 percent $K_2CO_3$ based on these three ingredients.

Example 11

Example 4 is repeated with isopentylenes in place of butylenes. The feed contained 11 mole percent 2-methyl butene-1 and 88.5 mole percent 2-methyl butene-2. Isoprene was obtained in yields at conversions and selectivities better than those obtained with butene-2. When this catalyst is employed to dehydrogenate ethyl benzene, good yields of styrene are obtained at satisfactory conversion and selectivity levels.

It will be apparent to the man skilled in the art that while the above examples were conducted under relatively standard conditions, that considerable variation in operating conditions can be made and excellent results obtained. For example, space velocity may be varied between about 200 to 500 or more volumes per hour per unit volume of catalyst. Likewise the steam/olefin ratio may be varied from about 10 to about 20 or more moles of steam per mole of olefin. In the case of both butylenes and isopentylenes, the feed stock composition may be varied quite widely and although butene-2 and 2-methyl butene-2 were employed in the examples, butene-1, 2-methyl butene-1 and 3-methyl butene-1, or mixtures thereof with butene-2 and 2-methyl butene-2 respectively, as well as other olefins such as methyl ethyl benzene, may be employed. Similarly, feed streams containing lower concentrations of the mono-olefins to be dehydrogenated may be employed. Many commercial operations use feed stocks containing from 60 to 85 percent of the mono-olefins to be dehydrogenated.

Other catalysts of the type described herein may also be prepared and used in accordance with this invention in addition to those specifically set forth in the examples. Although the examples show fixed catalyst beds, the catalysts may be employed in fluidized beds. Of course, much smaller average particle size catalyst will be used, as from about 10 to about 150 microns. The separate ingredients or any desirable mixture or combination thereof may be ground to the required size and adequate mixing obtained in the reactor by means of a suitable fluidizing gas such as hydrogen.

We claim:

1. In a process for effecting dehydrogenation of olefins in the presence of steam, the improvement which comprises conducting said dehydrogenation in the presence of a catalyst comprising about 25 to 60 weight percent titanium dioxide and about 75 to 40 total weight percent of (1) ferric oxide and (2) a compound of potassium convertible to potassium carbonate under dehydrogenation reaction conditions, the ratio of said potassium compound calculated as potassium carbonate to ferric oxide being from about 5 to about 200 percent.

2. In a process for effecting continuous high temperature dehydrogenation of mono-olefins in the presence of steam, the improvement which comprises conducting said dehydrogenation in the presence of a catalyst comprising 25 to 60 weight percent titanium dioxide and 75 to 40 total weight percent of (1) ferric oxide and (2) potassium carbonate, the ratio of ferric oxide to potassium carbonate being one part of ferric oxide with from about one-half to two parts of potassium carbonate.

3. In a process for effecting continuous high temperature dehydrogenation of a mono-olefin selected from the group consisting of n-butylenes and methyl-butylenes in the presence of steam, the improvement which comprises passing said mono-olefin over a catalyst consisting essentially of 35 to 50 weight percent titanium dioxide, 20 to 40 weight percent ferric oxide and 20 to 40 weight percent potassium carbonate.

4. In a process for effecting continuous high temperature dehydrogenation of n-butene in the presence of steam, the improvement which comprises passing said mono-olefin over a catalyst consisting essentially of about 40 weight percent titanium dioxide, about 28 weight percent ferric oxide and about 32 weight percent potassium carbonate.

5. In a process for effecting continuous high temperature dehydrogenation of n-butene in the presence of steam, the improvement which comprises passing said mono-olefin over a catalyst consisting essentially of about 40 weight percent titanium dioxide, about 26 weight percent ferric oxide, about 32 weight percent potassium carbonate and about one to 5 weight percent chromic sesquioxide.

6. A catalyst for effecting dehydrogenation of olefins in the presence of steam, comprising about 25 to 60 weight percent titanium dioxide and about 75 to 40 total weight percent of (1) ferric oxide and (2) a compound of potassium convertible to potassium carbonate under dehydrogenation reaction conditions, the ratio of said potassium compound calculated as potassium carbonate to ferric oxide being from about 5 to about 200 percent.

7. A catalyst for effecting continuous high temperature dehydrogenation of mono-olefins in the presence of steam, comprising 25 to 60 weight percent titanium dioxide and 75 to 40 total weight percent of (1) ferric oxide and (2) potassium carbonate, the ratio of iron oxide to potassium carbonate being one part of ferric oxide with from about ½ to two parts of potassium carbonate.

8. A catalyst for effecting continuous high temperature dehydrogenation of a mono-olefin selected from the group consisting of butylenes and methylbutylenes in the presence of steam, consisting essentially of 35 to 50 weight percent titanium dioxide, 20 to 40 weight percent ferric oxide and 20 to 40 weight percent potassium carbonate.

9. A catalyst for effecting high temperature dehydrogenation of n-butene in the presence of steam consisting essentially of about 40 weight percent titanium dioxide, about 24 to 28 weight percent ferric oxide, about 30 to 35 weight percent potassium carbonate and about one to 5 weight percent chromium sesquioxide.

References Cited in the file of this patent

UNITED STATES PATENTS

| | | |
|---|---|---|
| 1,935,178 | Connolly | Nov. 14, 1933 |
| 2,315,107 | Chickenoff et al. | Mar. 30, 1943 |
| 2,378,209 | Fuller et al. | June 12, 1945 |
| 2,414,585 | Eggertsen et al. | Jan. 21, 1947 |
| 2,523,686 | Engel | Sept. 26, 1950 |
| 2,664,451 | Owen | Dec. 29, 1953 |
| 2,666,086 | Pitzer | Jan. 12, 1954 |
| 2,769,811 | Mahon | Nov. 6, 1956 |
| 2,775,637 | Lanning et al. | Dec. 25, 1956 |